United States Patent
Fedorovich

(10) Patent No.: US 8,591,116 B2
(45) Date of Patent: Nov. 26, 2013

(54) BEARING ISOLATING SEAL

(75) Inventor: George Fedorovich, Nacogodoches, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 467 days.

(21) Appl. No.: 12/991,620

(22) PCT Filed: May 8, 2009

(86) PCT No.: PCT/US2009/043247
§ 371 (c)(1),
(2), (4) Date: Nov. 8, 2010

(87) PCT Pub. No.: WO2009/137746
PCT Pub. Date: Nov. 12, 2009

(65) Prior Publication Data
US 2011/0058763 A1   Mar. 10, 2011

Related U.S. Application Data

(60) Provisional application No. 61/051,487, filed on May 8, 2008.

(51) Int. Cl.
*F16C 33/80* (2006.01)
*F16J 15/447* (2006.01)

(52) U.S. Cl.
USPC .......................................... 384/480; 277/412

(58) Field of Classification Search
USPC .......... 384/130, 140, 144, 477, 480; 277/303, 277/412
See application file for complete search history.

(56) References Cited

U.S. PATENT DOCUMENTS

| | | | |
|---|---|---|---|
| 1,958,412 A | * | 5/1934 | Andrada et al. ............... 384/480 |
| 3,799,634 A | | 3/1974 | Sernetz et al. |
| 4,022,479 A | | 5/1977 | Orlowski |
| 4,088,329 A | | 5/1978 | Junker |
| 4,114,902 A | | 9/1978 | Orlowski |
| 4,175,752 A | | 11/1979 | Orlowski |
| 4,304,409 A | | 12/1981 | Orlowski |
| 4,466,620 A | | 8/1984 | Orlowski |
| 4,482,194 A | | 11/1984 | Chambers |
| 4,576,383 A | | 3/1986 | Ballard |
| 4,706,968 A | | 11/1987 | Orlowski |

(Continued)

FOREIGN PATENT DOCUMENTS

| | | |
|---|---|---|
| FR | 2 078 595 | 11/1971 |
| FR | 2 175 477 | 10/1973 |
| GB | 1 191 672 | 5/1970 |

OTHER PUBLICATIONS

International Search Report for corresponding application No. PCT/US2009/043247 dated Jul. 10, 2009.

*Primary Examiner* — James Pilkington
(74) *Attorney, Agent, or Firm* — Renner, Otto, Boisselle & Sklar, LLP

(57) ABSTRACT

A bearing-isolating seal (40) comprises a metal seal member (50) and a non-metal seal member (60). The seal members (50, 60) comprise radial walls (51-53, 61-62) defining annular slots (55-56, 65) that together form a labyrinth-like path through the seal (40). The spindle-side wall (62) of the metal seal member (50) is sized for press-fit attachment around a spindle and the roller-side wall (51) of the non-metal seal member (60) is adapted to receive a roller therearound.

21 Claims, 3 Drawing Sheets

(56) References Cited

U.S. PATENT DOCUMENTS

| | | | |
|---|---|---|---|
| 4,817,966 A | 4/1989 | Borowski | |
| 4,832,350 A | 5/1989 | Orlowski | |
| 4,852,890 A | 8/1989 | Borowski | |
| 4,972,939 A | 11/1990 | Uttke et al. | |
| 4,989,883 A | 2/1991 | Orlowski | |
| 5,024,451 A | 6/1991 | Borowski | |
| 5,028,054 A | 7/1991 | Peach | |
| 5,046,869 A | 9/1991 | Roberts et al. | |
| 5,069,461 A | 12/1991 | Orlowski | |
| 5,074,567 A | 12/1991 | Orlowski | |
| 5,137,049 A | 8/1992 | Orlowski | |
| 5,158,304 A | 10/1992 | Orlowski | |
| 5,161,804 A | 11/1992 | Orlowski | |
| 5,174,583 A | 12/1992 | Orlowski | |
| 5,188,214 A | 2/1993 | Uttke | |
| 5,221,095 A | 6/1993 | Orlowski | |
| 5,261,528 A | 11/1993 | Bouchal | |
| 5,433,308 A * | 7/1995 | Gagnon | 193/37 |
| 6,095,320 A | 8/2000 | DeMong et al. | |
| 6,206,182 B1 | 3/2001 | Wilson et al. | |
| 6,234,293 B1 * | 5/2001 | Fasoli | 193/37 |
| 6,287,014 B1 | 9/2001 | Salla | |
| 6,641,512 B2 | 11/2003 | Bryant | |
| 2003/0201609 A1 | 10/2003 | Hood | |
| 2008/0153683 A1 * | 6/2008 | Kirkpatrick et al. | 492/16 |

\* cited by examiner

BEARING ISOLATING SEAL

This application is a national phase of International Application No. PCT/US2009/043247 filed May 8, 2009 and published in the English language, which claims priority of U.S. Provisional Patent Application No. 61/051,487 filed on May 8, 2008.

A belt conveyor, such as that used in the mining industry, typically employs a series of stands or pedestals on which idler rollers are rotatably mounted to fixed shafts. The rollers usually each include a bearing mounted within a chamber within the roller hub. A seal can be provided to seal the annular space between the roller hub and the spindle to prevent leakage of lubricant from the bearing chamber and prevent the ingress of contaminants thereinto.

SUMMARY

A seal is provided for sealing the annular space between a roller hub and a spindle to prevent lubricant leakage and/or contaminant ingress. The seal comprises a metal seal member and a non-metal (e.g., plastic) seal member that, without contacting, together form a labyrinth like-path. The seal members can be made from lower-cost materials and/or made by less-expensive manufacturing methods than traditional labyrinth seals. For example, the metal seal member can be made from a non-bronze metal and it can be made by a non-machining method such as molding or stamping. The non-metal seal member can be made from a non-PTFE material and likewise made by a non-machining method.

DRAWINGS

DESCRIPTION

Figure 1:
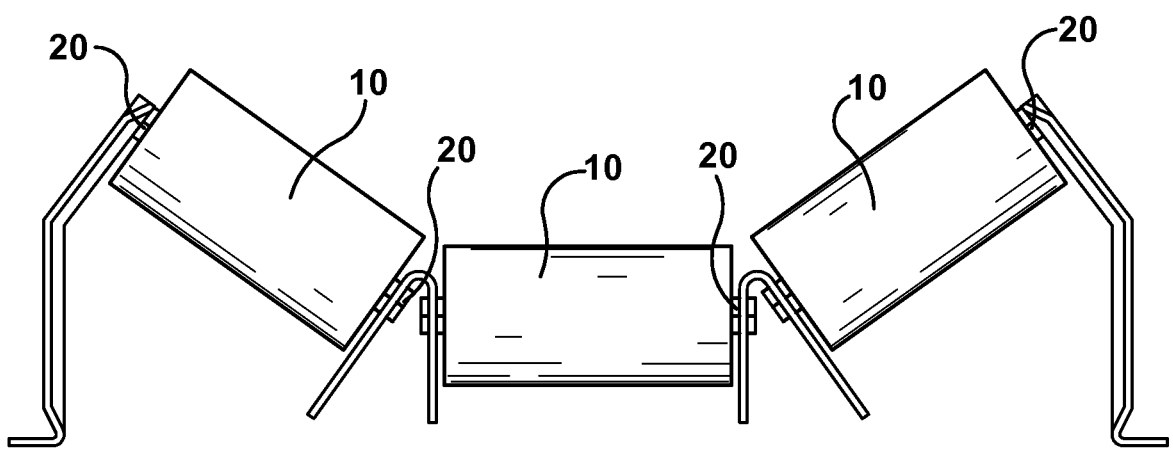
FIG. 1 is a front view of three idler rollers mounted on a stand.

Referring now to the drawings, and initially to FIG. 1, three idler rollers 10 are shown mounted in a wing-like configuration with the outer rollers being angled upwardly oriented and the center roller 10 being generally horizontal. The rollers 10 can be adapted to, for example, support conveyor belts. In any event, the rollers 10 are mounted for rotation relative to spindles 20 which are in turn attached to support members of a stand or other pedestal.

Figure 2:
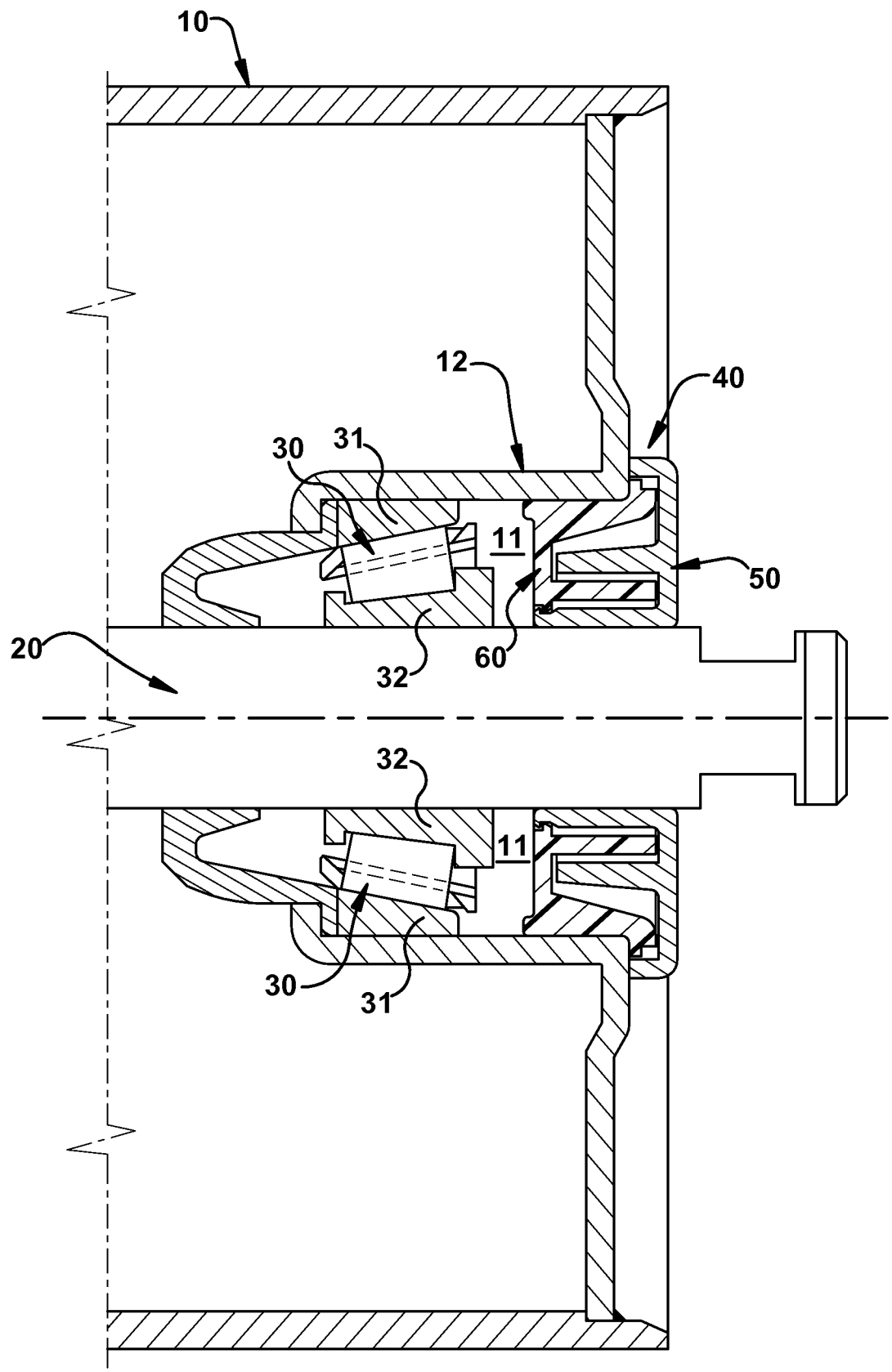
FIG. 2 is a sectional view of a roller, its spindle, its bearing, and its seal.

A roller 10, its spindle 20, and other interfacing components are shown in more detail in FIG. 2. These interfacing components can include a bearing 30 mounted within a bearing chamber 11 in the hub 12 of the roller 10. The bearing 30 can comprise an outer race 31 attached to the roller hub 12 and an inner race 32 attached to the spindle 12 in a conventional manner. A seal 40 is provided to seal the annular space between the roller hub 12 and the spindle 20 to prevent leakage of the lubricant from the bearing chamber 11 and to prevent ingress of contaminants thereinto.

Figure 3:
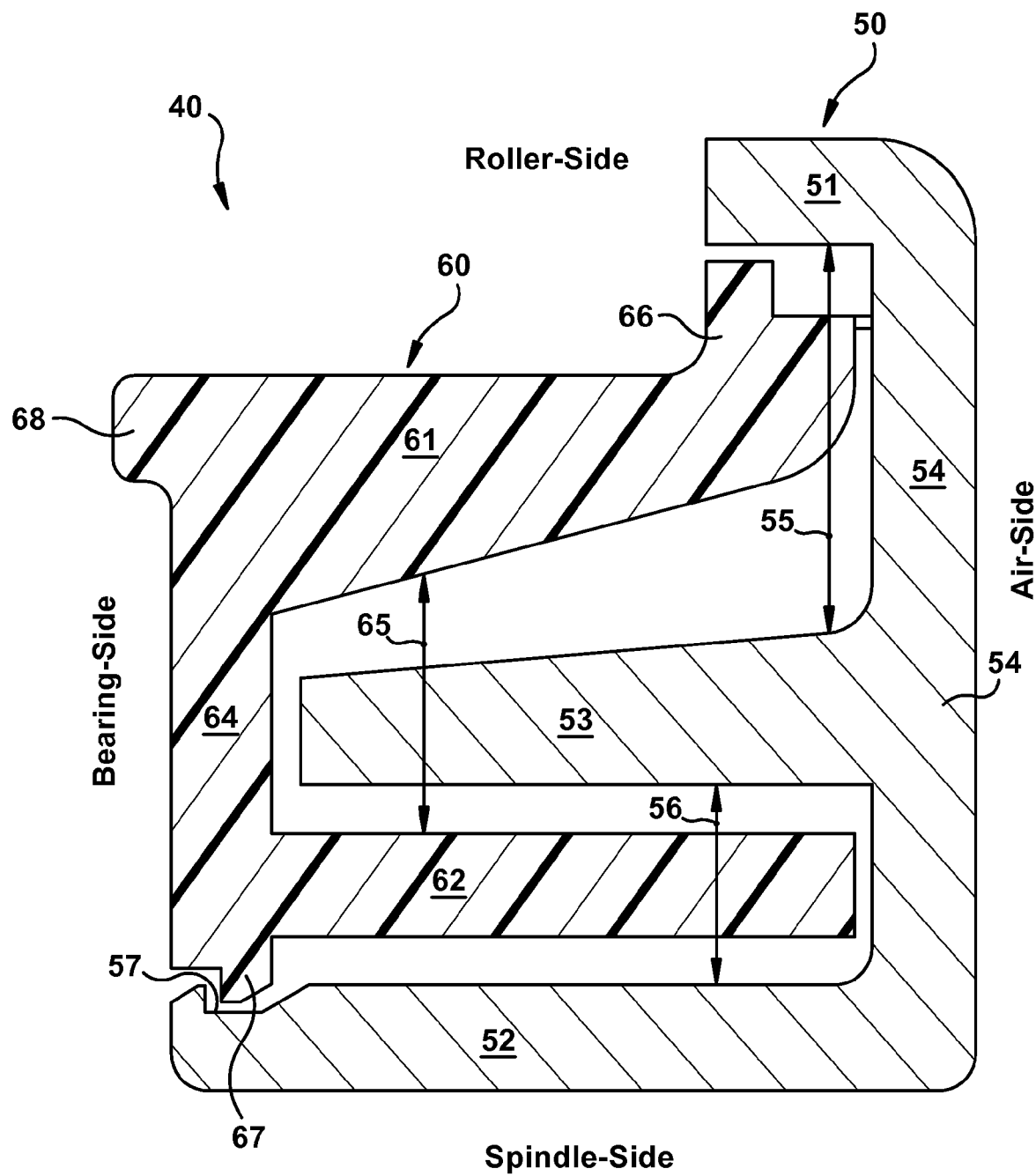
FIG. 3 is a sectional view of the seal.

The seal 40 is shown isolated from the roller 10, the spindle 20, and the bearing 30 in FIG. 3. The seal 40 comprises a metal sealing member 50 and a plastic sealing member 60. The orientation of the seal 40 and/or the members 50/60 can be explained by reference to the roller-side (nearest the roller 10), the spindle-side (adjacent the spindle 20), the bearing-side (closest to the bearing 30), and the air-side (outside the confines of the roller 10).

The metal seal member 50 comprises three radial walls 51-53 and an axial wall 54 from which they perpendicularly project in the bearing-side direction. A roller-side slot 55 is formed between the radials wall 51 and 53, and a spindle-side slot 56 is formed between the radial walls 52 and 53. The roller-side surface of the radial wall 52 has a notch 57 near its bearing-side end.

The walls 51-54 have substantially the same and/or a constant thickness, except for intermediate wall 53 which tapers radially outward in the air-side direction. The spindle-side radial wall 52 is the longest in the axial dimension, with the intermediate radial wall 53 being slightly shorter, and the roller-side radial wall 51 being substantially shorter than the walls 52-53. The spindle-side radial wall 52 is radially sized to be press-fit around the spindle 20 and remain non-rotatably fixed thereto during relative rotation of the roller 10.

The non-metal seal member 60 comprises radial walls 61-62 and an axial wall 64 from which the perpendicularly project in the air-side direction. The radial walls 61 and 62 extend approximately the same axial length and they form a slot 65 therebetween. The axial wall 61 is radially sized for receipt of the roller 10 (and/or its hub 12) therearound and remains non-rotatably fixed thereto during relative rotation of the roller 10.

The roller-side radial wall 61 has a triangular shape tapering radially inward in the bearing-side direction. The spindle-side radial wall 62 and the axial wall 64 have substantially the same and/or a constant thickness. A stepped flange 66 extends radially outward from the air-side end of the roller-side wall 61. A ramped tab 67 extends radially inward from the spindle-side end of the axial wall 64, and a rounded-corner projection 68 extends axially inward from this wall's roller-side end.

The intermediate radial wall 53 of the metal seal member 50 is situated within the slot 65 in the non-metal seal member 60. The stepped flange 66 of the non-metal seal member 60 is situated within the roller-side slot 55 of the metal seal member 50. And the ramped tab 67 of the non-metal seal member 60 is situated within the notch 57 of the spindle-side radial wall 52 of the metal member 50. This intertwined-like situating of the seal members 50 and 60 forms a labyrinth path through the seal member 40.

The shortness of the roller-side radial wall 51 of the metal seal member 50 and/or the stepped geometry of the flange 66 of the non-metal seal member 50 can facilitate installation of the seal 40. Specifically, the short metal wall 51 can be deflected inwardly against the flange 66 as the seal 40 is pushed into roller 10. When the seal 40 reaches the proper position, and the installation tool is removed, the wall 51 and/or flange 66 will recoil creating a clearance therebetween.

The rounded projection 68 of the non-metal seal member 60 may be helpful in diverting contaminant flow in an unusually severe application.

The metal seal member 50 can be made of any suitable metal (e.g., bronze, aluminum, stainless steel, tin, etc.) by any suitable technique (e.g., machining, stamping, molding, etc.). The non-metal seal member 60 can be made of any suitable plastic material (e.g., polytetrafluoroethylene, fluoroelastomers, rubber, nylon, etc.) by any suitable technique (e.g., machining, molding, injection molding, etc.). That being said, an advantage of the seal 40 is that it can be made with lower-cost materials and methods than those conventionally used for labyrinth-like seals. Specifically, for example, the metal member 50 can be made from non-bronze metal by a non-machining method (e.g., stamping, molding), and/or the non-metal member 60 can be made from a non-PTFE plastic by a non-machining method (e.g., molding, injection molding).

Although the roller 10, the seal 40, and/or the seal members 50 and 60, have been shown and described with respect to a certain embodiments, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of embodiments, such feature can be combined with one or more other features of the other embodiments.

The invention claimed is:

1. A roller, a spindle, a bearing interposed between the roller and the spindle in a bearing chamber, and a bearing-isolating seal sealing an annular space between the roller and the spindle, the roller rotating relative to the spindle;
    wherein the seal comprises a metal seal member and a non-metal seal member;
    wherein the metal seal member comprises:
        a roller-side radial wall,
        a spindle-side radial wall sized for attachment to the spindle,
        an intermediate radial wall located radially between the roller-side radial wall and the spindle-side radial wall,
        an axial wall from which the radial walls perpendicularly project in a bearing-side direction,
        a roller-side slot between the roller-side radial wall and the intermediate radial wall, and
        a spindle-side slot between the spindle-side radial wall and the intermediate radial wall;
    wherein the non-metal seal member comprises:
        a roller-side radial wall for attachment to the roller,
        a spindle-side radial wall,
        an axial wall from which the spindle-side radial wall and the roller-side radial wall perpendicularly project in an air-side direction, and
        a slot between the roller-side radial wall and the spindle-side radial wall; and
    wherein the intermediate radial wall of the metal seal member is situated within the slot of the non-metal seal member, and the spindle-side radial wall of the non-metal seal member is situated within the spindle-side slot of the metal seal member; and
    wherein the metal seal member has a notch and the non-metal sealing member has a tab axially captured in the notch, whereby the metal seal member and non-metal seal member will held together against axial separation.

2. The roller, the spindle, the bearing, and the bearing-isolating seal as set forth in claim 1, wherein the notch is on the roller-side surface of the spindle-side radial wall, and the tab extends radially inward from a spindle-side end of the axial wall of the non-metal seal member.

3. The roller, the spindle, the bearing, and the bearing-isolating seal as set forth in claim 2, wherein the tab has a ramped edge that ramps radially inwardly in the bearing-side direction.

4. The roller, the spindle, the bearing, and the bearing-isolating seal as set forth in claim 1, wherein the roller-side radial wall of the non-metal seal member has a flange extending radially outward from an air-side end of the roller-side radial wall; and
    wherein the flange is situated within the roller-side slot of the metal seal member.

5. The roller, the spindle, the bearing, and the bearing-isolating seal as set forth in claim 4, wherein the flange has a stepped profile.

6. The roller, the spindle, the bearing, and the bearing-isolating seal as set forth in claim 1, wherein the axial wall of the non-metal seal assembly has a projection extending axially, in the bearing-side direction, from a roller-side end of the axial wall.

7. The roller, the spindle, the bearing, and the bearing-isolating seal as set forth in claim 6, wherein the projection has rounded corners.

8. The roller, the spindle, the bearing, and the bearing-isolating seal as set forth in claim 1, wherein the walls of the metal seal member have substantially the same and/or a constant thickness, except for the intermediate radial wall which tapers radially outward in the air-side direction.

9. The roller, the spindle, the bearing, and the bearing-isolating seal as set forth in claim 1, wherein the radial walls of the metal seal member have different axial dimensions, with the spindle-side radial wall being the longest, the intermediate radial wall being slightly shorter, and the roller-side radial wall being substantially shorter than the other radial walls.

10. The roller, the spindle, the bearing, and the bearing-isolating seal as set forth in claim 1, wherein the metal seal member is made from bronze.

11. The roller, the spindle, the bearing, and the bearing-isolating seal as set forth in claim 1, wherein the metal seal member is made from a non-bronze metal.

12. The roller, the spindle, the bearing, and the bearing-isolating seal as set forth in claim 1, wherein the metal seal member is made from aluminum, stainless steel, or tin.

13. The roller, the spindle, the bearing, and the bearing-isolating seal as set forth in claim 1, wherein the metal seal member is made by a non-machining method.

14. The roller, the spindle, the bearing, and the bearing-isolating seal as set forth in claim 1, wherein the metal seal member is made by stamping or molding.

15. The roller, the spindle, the bearing, and the bearing-isolating seal as set forth in claim 1, wherein the non-metal seal member is made of a plastic material.

16. The roller, the spindle, the bearing, and the bearing-isolating seal as set forth in claim 15, wherein the plastic seal member is made from a non-PTFE plastic.

17. The roller, the spindle, the bearing, and the bearing-isolating seal as set forth in claim 1, wherein the non-metal seal member is made of rubber or nylon.

18. The roller, the spindle, the bearing, and the bearing-isolating seal as set forth in claim 1, wherein the non-metal seal member is made by a non-machining method.

19. The roller, the spindle, the bearing, and the bearing-isolating seal as set forth in claim 1, wherein the non-metal seal member is made by a molding method.

20. The roller, the spindle, the bearing, and the bearing-isolating seal as set forth in claim 1, wherein the non-metal seal member is made by an injection molding method.

21. The roller, the spindle, the bearing, and the bearing-isolating seal as set forth in claim 1, wherein the bearing comprises an inner race attached to the spindle and an outer race attached to the roller.

* * * * *

UNITED STATES PATENT AND TRADEMARK OFFICE
CERTIFICATE OF CORRECTION

PATENT NO. : 8,591,116 B2  Page 1 of 1
APPLICATION NO. : 12/991620
DATED : November 26, 2013
INVENTOR(S) : George Fedorovich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 469 days.

Signed and Sealed this
Twenty-second Day of September, 2015

Michelle K. Lee
*Director of the United States Patent and Trademark Office*